United States Patent [19]

Gerlinger

[11] 4,179,872

[45] Dec. 25, 1979

[54] HAYMAKING MACHINE FOR CENTRAL TEDDING AND LATERAL WINDROWING

[75] Inventor: Frédéric Gerlinger, Ottersthal, France

[73] Assignee: Kuhn, S.A., Saverne, France

[21] Appl. No.: 848,592

[22] Filed: Nov. 4, 1977

[30] Foreign Application Priority Data

Nov. 5, 1976 [FR] France .................. 76 34064

[51] Int. Cl.² ........................................... A01D 81/00
[52] U.S. Cl. ................................................... 56/366
[58] Field of Search ................ 56/365, 366, 370, 377

[56] References Cited

U.S. PATENT DOCUMENTS

| 3,320,734 | 5/1967 | van der Lely | 56/366 |
| 3,975,892 | 8/1976 | Hellkuhl | 56/365 |

FOREIGN PATENT DOCUMENTS

1198182  7/1970  United Kingdom ............ 56/366

*Primary Examiner*—Russell R. Kinsey
*Attorney, Agent, or Firm*—Young & Thompson

[57] ABSTRACT

A haymaking machine for central tedding and lateral windrowing has a pair of rotary rake heads carrying working tools. The tools are rotatively interconnected by means of a support chassis that carries a forwardly extending frame beam. The direction of rotation of the rotary rake heads automatically reverses when the relative position between the support chassis of the rotary rake heads and the frame beam is modified, thereby to transpose the machine from the tedding position into the windrowing position and vice versa.

7 Claims, 13 Drawing Figures

HAYMAKING MACHINE FOR CENTRAL TEDDING AND LATERAL WINDROWING

The present invention relates to a combined hay-making machine for central tedding and lateral windrowing, provided with at least two rotary rake heads carrying working tools, which are driven in rotation and interconnected by means of a support chassis upon which there is articulated at least one frame beam extending forward when viewed in the direction of travel, and permitting coupling of the machine to a propelling vehicle. The transposition of these combined machines from the central tedding position into the lateral windrowing position or vice versa necessitates a multitude of adjustments which are generally lengthy and tedious to effect. In fact it is necessary especially:

to modify the orientation of the support chassis of the rotary rake heads in relation to the frame beam, in a substantially horizontal plane;
to modify the inclination of the axes of rotation of the rotary rake heads in relation to the ground;
to reverse the direction of rotation of at least one of the rotary rake heads;
to orient the land wheels of the rotary rake heads in the direction of travel of the machine;
to bring the working tools into the appropriate position for the tedding or windrowing work.

All these operations represent a significant loss of time for the user. Moreover it can occur that one or more of these adjustments is badly executed or even omitted, which involves work of poor quality and can even cause deterioration of the machine. Thus if in the transposition of the machine from the lateral windrowing position into the central tedding position the two adjacent rotary rake heads remain in the same direction of rotation, while their working tools are situated in the position appropriate for tedding, these tools can collide and therefore cause significant damage to the machine.

The present invention has the purpose of reducing the number of adjustments to be carried out in the transposition of the machine from one working position into the other in such manner as to reduce at the same time the duration of this operation and the risk of poor adjustments.

To this end, one important characteristic of the invention consists in that the machine comprises means which automatically cause the reversal of the direction of rotation of at least one of the rotary rake heads when the relative position between the support chassis of the rotary rake heads and the frame beam is modified, in order to transpose the machine from the central tedding position into the lateral windrowing position and vice versa. This automation permits of eliminating the manual reversal of the direction of rotation of one of the rotary rake heads during the said transposition and furthermore avoids the danger of collision between the working tools of the two adjacent rotary rake heads.

The invention will be explained in greater detail hereinafter, with further characteristics and advantages, with reference to several embodiments of the invention illustrated by way of non-limitative example in the accompanying drawings, wherein.

Figure 1:
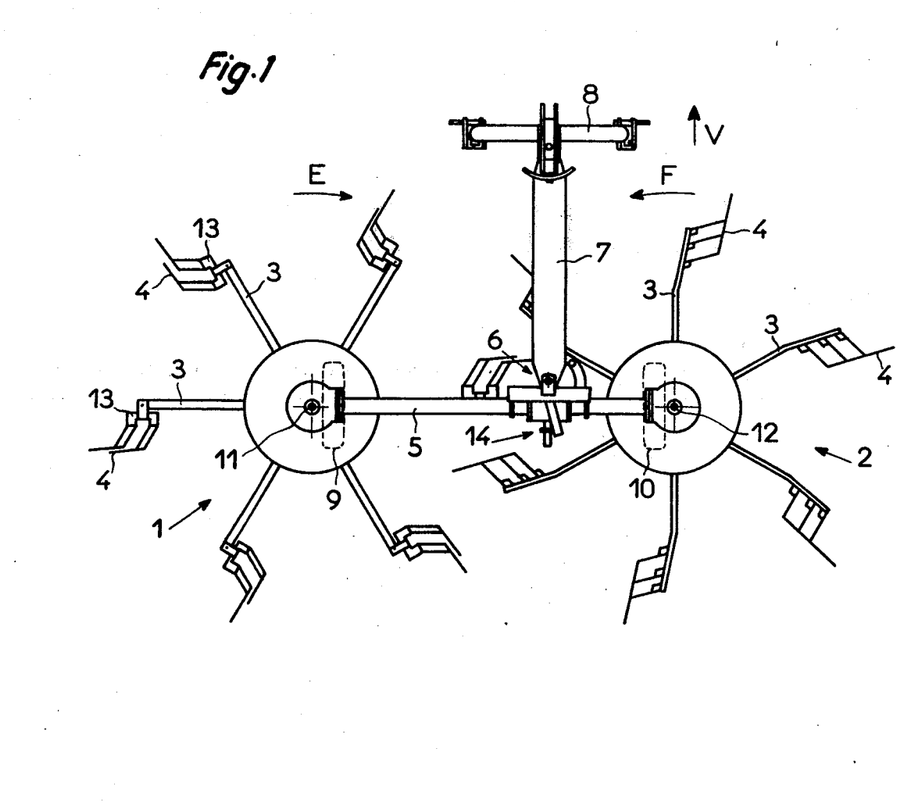
FIG. 1 represents a plan view of a first embodiment of a machine according to the invention, situated in the central tedding position.
Figure 2:
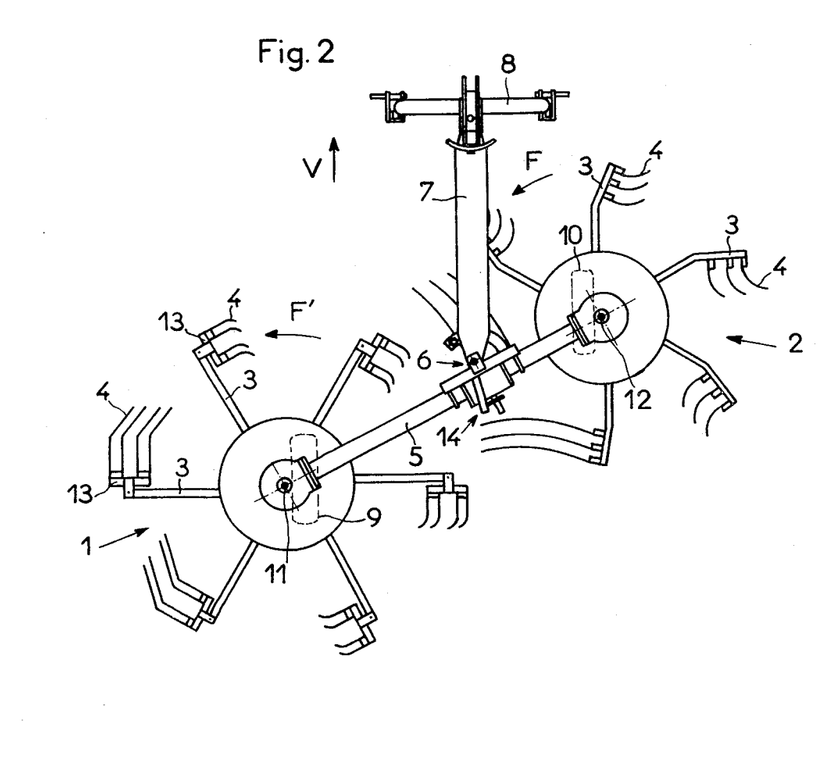
FIG. 2 likewise represents a plan view of the embodiment as represented in FIG. 1, the machine being situated in the lateral windrowing position.

The combined haymaking machine for central tedding and lateral windrowing as represented in the accompanying drawings comprises at least two rotary rake heads 1 and 2. Each of these rotary rake heads 1 and 2 comprises several arms 3 extending outward and carrying working tools such as tines, forks or analogous elements at their extremities remote from the center of the corresponding rotary rake head. The said rotary rake heads 1 and 2 are interconnected by means of a support chassis 5. To this chassis there is connected by means of a pivotal connection 6 at least one frame beam 7 extending forward, when viewed in the direction V of travel of the machine, that permits the coupling of the machine to a propelling vehicle (not shown). In the embodiment as represented in FIGS. 1 and 2 the frame beam 7 is connected to a hitch frame 8 permitting coupling of the machine to the three-point linkage device of the said propelling vehicle. During normal operation this machine can move over the ground by means of land wheels 9 and 10 placed beneath the rotary rake heads 1 and 2. In the central tedding position as represented in FIG. 1 the support chassis 5 mounting the rotary rake heads 1 and 2 extends substantially perpendicularly to the intended direction V of travel. The said rotary rake heads 1 and 2 are driven in rotation in such manner as to rotate converging forward in the direction of the arrows E and F, about rotation axes 11 and 12 which are inclined forward when viewed in the direction V of travel. Moreover the working tools 4 are situated in a position appropriate for tedding, in which they remain in contact with the crop over a large part of their trajectory. Thus the crop situated on the ground in front of the machine is grasped by the said working tools 4 which entrain it between the rotary rake heads 1 and 2 and spread it uniformly behind the machine.

In the lateral windrowing position as represented in FIG. 2 the support chassis 5 is placed obliquely in relation to the direction V of travel and the land wheels 9 and 10 of the rotary rake heads 1 and 2 are oriented in the direction V of travel. The said rotary rake heads 1 and 2 are driven in rotation in such manner as to rotate in the same direction of rotation which is indicated by the arrows F and F'. The position of the working tools 4 of the rotary rake head 1, the direction of rotation of which has been reversed, is likewise modified by means of a reversible support 13 so that these working tools are always urged in the same direction. Moreover in this position the rotation axes 11 and 12 are substantially vertical. The vertical positioning of these rotation axes 11 and 12 can be effected with the aid of different means which are known and not represented, such as a threaded crank handle or a cylinder-piston unit. Moreover the working tools 4 of the rotary rake heads 1 and 2 are situated in a position appropriate to windrowing, in which they easily disengage themselves from the raked fodder in order to favor the formation of a windrow. To this end they can be controlled for example in such manner that over a partial range of their trajectory they pivot upwards and in the direction opposite to the direction of rotation of the corresponding rotary rake head 1 or 2. In this working position the rotary rake head 2 is disposed farther forward of and deposits the raked fodder before the rotary rake head 1 which then moves the said raked fodder laterally to form a lateral windrow.

It appears clearly from this description that the transposition of the machine from the central tedding position to the lateral windrowing position or vice versa necessitates numerous adjustments.

In order to simplify the said transposition from one position to the other, the machine according to the invention comprises means 14 which automatically cause the reversal of the direction of rotation of at least one of the rotary rake heads 1 and 2 when the relative position between the support chassis 5 of the rotary rake heads 1 and 2 and the frame beam 7 is modified, in order to transpose the machine from the central tedding position into the lateral windrowing position and vice versa. The said means 14 thus cause the rotary rake heads 1 and 2 to rotate converging forward when viewed in the direction V of travel, when the machine is transposed into the central tedding position, and in the same direction of rotation when the said machine is transposed into the lateral windrowing position, without the necessity of special intervention on the part of the operator.

Furthermore by reason of this important characteristic the risk of a poor adjustment of the direction of rotation of the rotary rake heads 1 and 2 in the two working positions is avoided.

Figure 3:
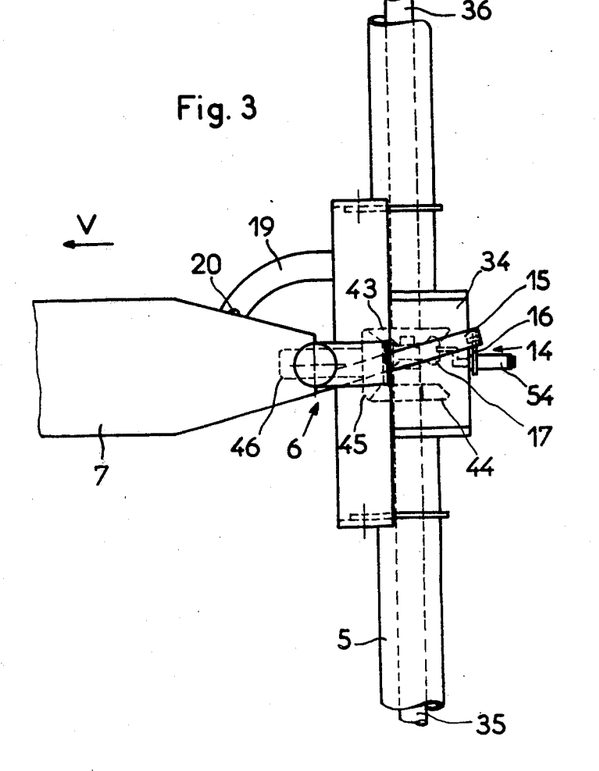
FIG. 3 shows a plan view on a larger scale of the first embodiment of the means for reversal of the direction of rotation of one of the rotary rake heads, the machine being situated in the central tedding position.
Figure 4:
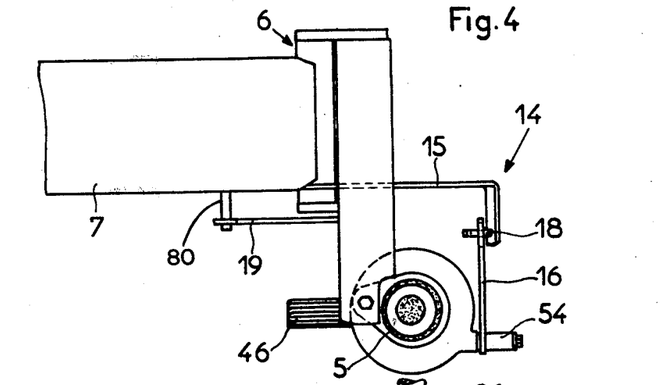
FIG. 4 shows a side view of the embodiment as represented in FIG. 3.
Figure 5:
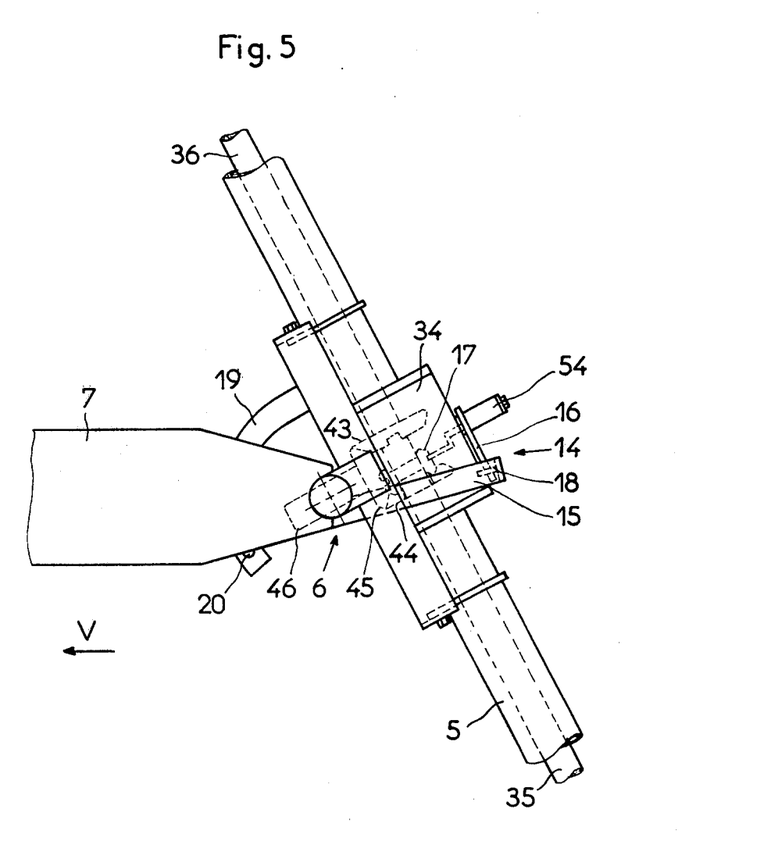
FIG. 5 shows a view similar to that in FIG. 3, the machine being situated in the lateral windrowing position.

According to the first embodiment of the said reversing means 14, which is represented on a larger scale in FIGS. 3, 4 and 5, the frame beam 7 comprises at its rear extremity adjacent the support chassis 5 a link 15 which is connected by means of a pin 18 to a control lever 16 of a dog clutch 17 for the reversal of the direction of rotation of at least one of the rotary rake heads 1 and 2. The said control lever 16 is disposed on the support chassis 5. When the support chassis 5 is pivoted in a substantially horizontal plane about the pivoted connection 6 in order to bring it into a perpendicular position (FIG. 3) or oblique position (FIG. 5) in relation to the direction V of travel of the machine, a displacement of the said chassis 5 occurs in relation to the frame beam 7 and the link 15 so that the latter displaces the control lever 16 of the dog clutch 17 and causes the reversal of the direction of rotation of the rotary rake head 1. The operation of the dog clutch 17 will be described hereinafter with reference to FIGS. 10 and 11.

In each of the working positions the support chassis 5 can be fixedly secured in relation to the frame beam 7 by means of a sector 19 fixed on the said chassis 5 and comprising a plurality of orifices 20 in which a bolt 80 fixed on the frame beam 7 can engage. Each of the said orifices 20 corresponds to one of the working positions.

Figure 6:
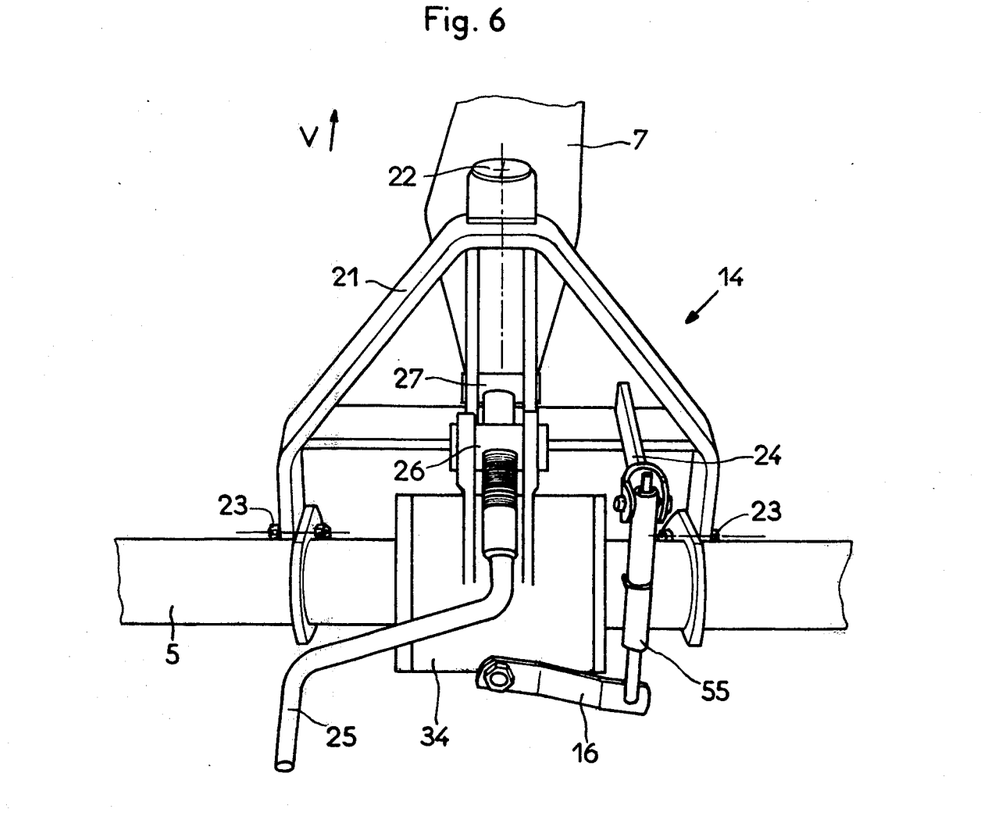
FIG. 6 shows a rear perspective view of a second embodiment of the means for reversal of the direction of rotation of at least one of the rotary rake heads, the machine being situated in the central tedding position.
Figure 7:
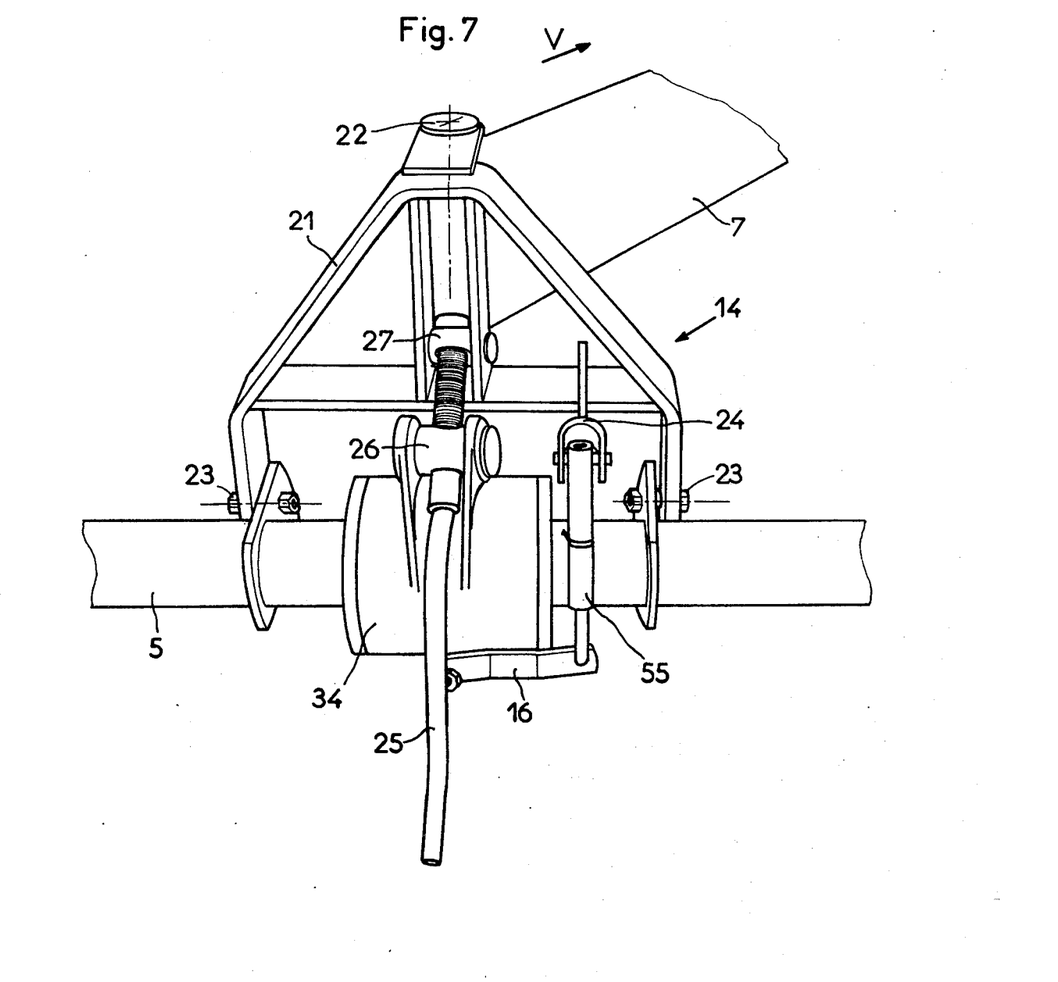
FIG. 7 represents a view similar to that in FIG. 6, the machine being situated in the lateral windrowing position.

In the second embodiment of the reversing means 14 illustrated in FIGS. 6 and 7, the elements in common with the first embodiment are designated by the same reference numerals. In this embodiment the frame beam 7 is connected to the support chassis 5 by means of an intermediate element 21. The latter is pivotally connected to the frame beam 7 by means of a substantially vertical pivot spindle 22 and to the support chassis 5 by means of substantially horizontal pivot spindles 23 which moreover are substantially parallel with the said support chassis 5. This intermediate element 21 comprises a link 24 connected to a control lever 16 of a dog clutch 17 for the reversal of the direction of rotation of at least one of the rotary rake heads 1 and 2. When the support chassis 5 is pivoted in relation to the frame beam 7 about the substantially horizontal pivot spindles 23 to modify the inclination of the rotation axes 11 and 12 of the rotary rake heads 1 and 2 in relation to the ground, in order to transpose the machine from the central tedding position (FIG. 6) into the lateral windrowing position (FIG. 7) or vice versa, a displacement of the said chassis 5 occurs in relation to the frame beam 7 and the intermediate element 21 with the link 24. By virtue of the displacement the said link 24 actuates the control lever 16 of the dog clutch 17 and causes the reversal of the direction of rotation of the rotary rake head 1. The pivoting of the support chassis 5 about the substantially horizontal pivot spindle 23 can be effected for example by means of a threaded crank handle 25. This on the one hand is screwed into a swivel pin 26 which is pivoted on the support chassis 5 and on the other hand is immobilized in translation in a second swivel pin 27 which is pivoted on the intermediate element 21. When the threaded handle 25 is rotated the swivel pin 26 moves along the said threaded handle and causes the support chassis 5 to pivot about the pivot spindle 23.

Figure 8:
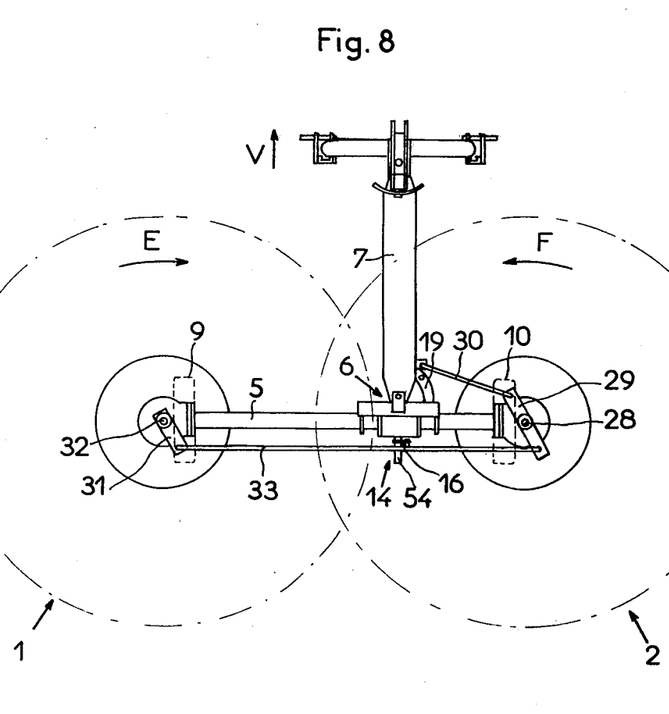
FIG. 8 shows a plan view of a third embodiment of a machine according to the invention, situated in the central tedding position.
Figure 9:
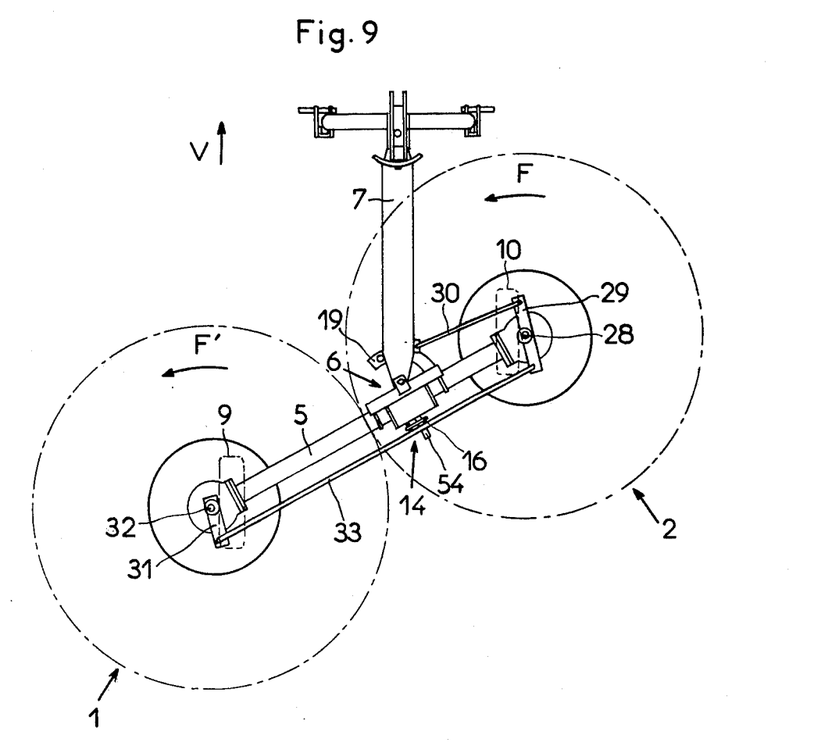
FIG. 9 shows a view similar to that in FIG. 8, the machine being situated in the lateral windrowing position.

In the third embodiment of the means 14 as represented in FIGS. 8 and 9, the parts in common with the two previously described embodiments are likewise designated by the same reference numerals. In this embodiment the upper extremity of the support spindle 28 of the land wheel 10 of the rotary rake head 2 protrudes upwards beyond the said rotary rake head and comprises an arm 29. This arm is connected to the frame beam 7 permitting coupling of the machine to a propelling vehicle by means of an operating rod 30. The said arm 29 is moreover connected to a second arm 31 which is fixed to the upper extremity of the support spindle 32 of the land wheel 9 of the rotary rake head 1, which likewise protrudes above the latter, by means of a link 33. This link extends substantially parallel with the support chassis 5 and is connected to a control lever 16 of a dog clutch 17 for the reversal of the direction of rotation of the rotary rake head 1. Thus when the support chassis 5 is pivoted in relation to the frame beam 7 in a substantially horizontal plane about the pivotal connection 6, in order to bring the chassis into a perpendicular position (FIG. 8) or an oblique position (FIG. 9) in relation to the direction V of travel, the operating rod 30 pivots the support spindles 28 and 32 of the land wheels 9 and 10, which are interconnected by the link 33, in such manner that the said wheels are automatically oriented in the direction V of travel. The said link 33 is therefore subjected to a longitudinal displacement and actuates the control lever 16 which causes the reversal of the direction of rotation of the rotary rake head 1. This arrangement permits of simultaneously and automatically modifying the orientation of the support chassis 5, the orientation of the land wheels 9 and 10 and the direction of rotation of the rotary rake head 1.

The dog clutch 17 effecting the reversal of the direction of rotation of the rotary rake head 1 is lodged in a housing 34 which is situated on the support chassis 5 between the rotary rake heads 1 and 2. From this housing 34 there extend two drive shafts 35 and 36 which are aligned with one another and each of which drives a rotary rake head 1 or 2 in rotation by means of bevel pinions 37 and 38 which are in engagement with toothed crowns 39 and 40 fixed on the drive hubs 41 and 42 of the said rotary rake head (see FIGS. 10 and 11). The drive shaft 36 comprises, at its end disposed in the housing 34 a bevel pinion 43 which is fixed to the said extremity, while the other drive shaft 35 comprises at its extremity disposed in the said housing 34 a bevel pinion 44 which is mounted freely in rotation on the said extremity. These two bevel pinions 43 and 44 are in engagement with a third bevel pinion 45 which is fixed to a transmission shaft 46 extending out of the housing 34 and intended to be connected to the power take-off of the drive vehicle through the intermediary of a cardan shaft (not shown).

Figure 10:
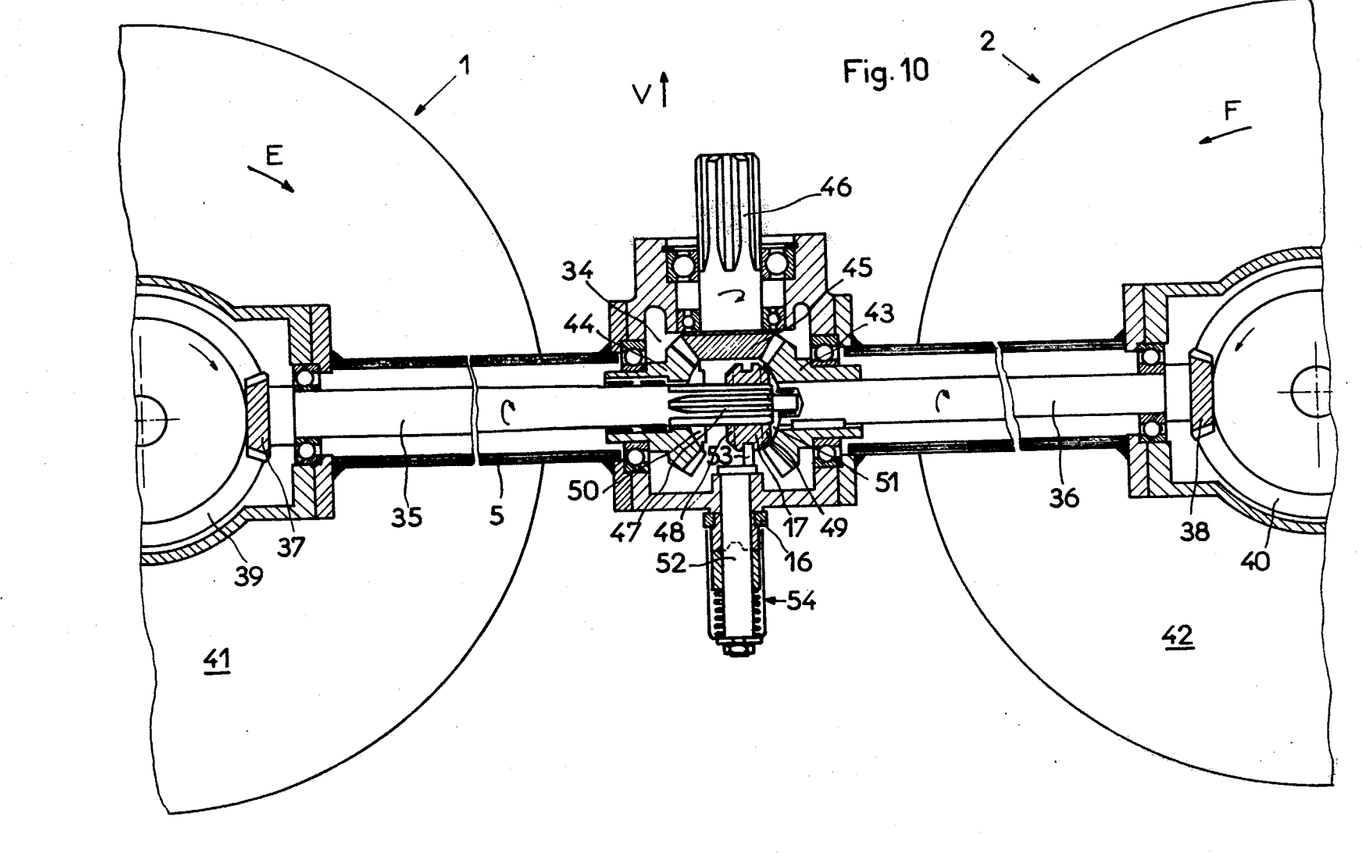
FIG. 10 shows a longitudinal section of the support chassis and the drive members of the rotary rake heads, the machine being situated in the central tedding position.
Figure 11:
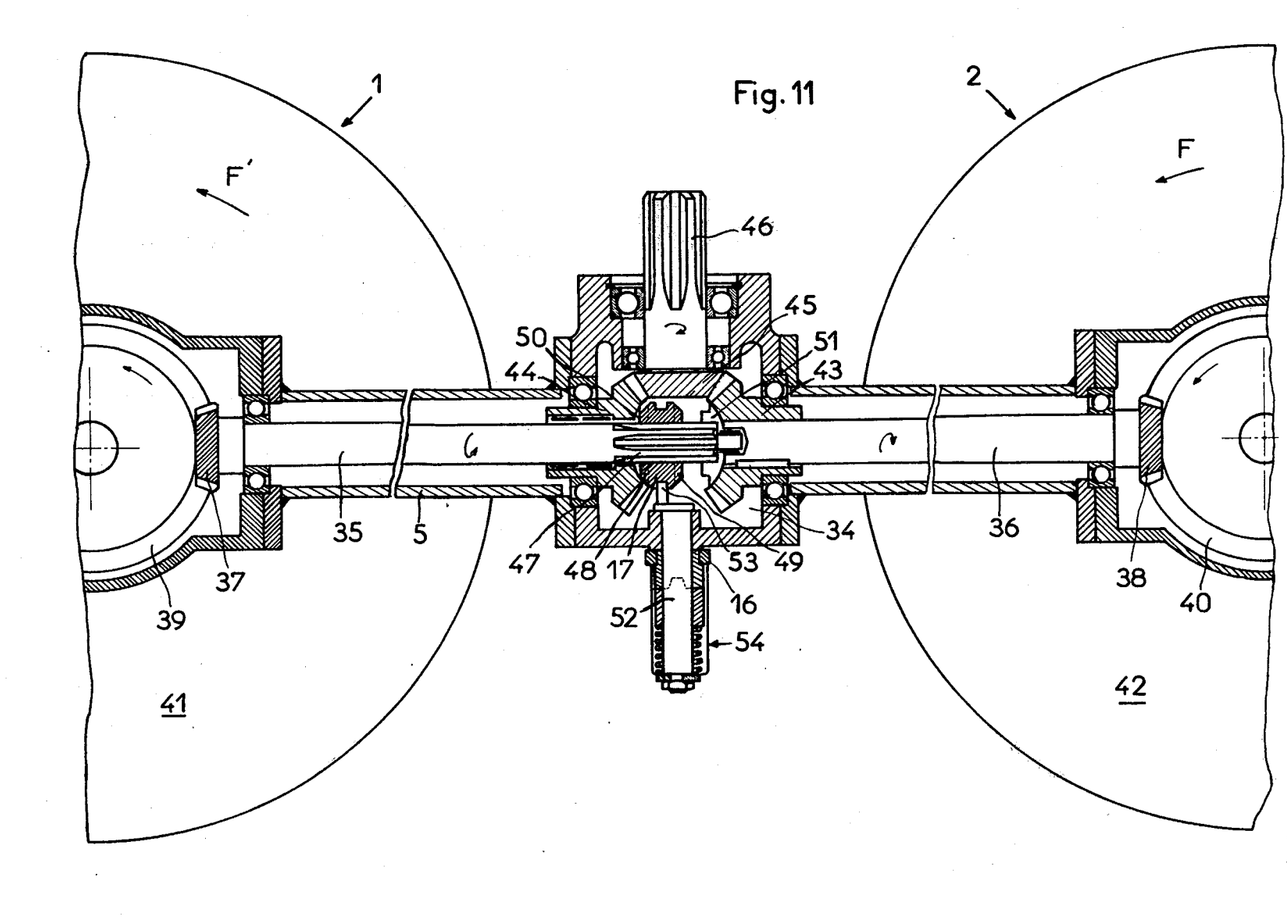
FIG. 11 shows a section similar to that in FIG. 10, the machine being situated in the lateral windrowing position.

The dog clutch 17 is keyed for axial sliding movement on the extremity of the drive shaft 35 by means of splines 47. The dog clutch 17 can thus be displaced longitudinally on the said extremity by means of the control lever 16 so as to be brought into engagement with the one or the other of the bevel pinions 43 and 44. To this end the dog clutch 17 comprises teeth 48 and 49 on its lateral faces which can mesh with complementary teeth 50 and 51 disposed on the bevel pinions 43 and 44. The control lever 16 is connected to the dog clutch 17 by means of an operating shaft 52 which penetrates into the housing 34 and comprises a fork 53 on its extremity which is in engagement with the said dog clutch 17.

Thus when the dog clutch 17 is in engagement with the bevel pinion 43 fixed on the drive shaft 36, it drives the second drive shaft 35, on which it is secured for rotation, in the same direction of rotation as that of the other drive shaft 36. Then the said drive shafts 35 and 36 drive the rotary rake heads 1 and 2 so that they rotate converging forwards, in the direction of the arrows E and F, which corresponds to the central tedding position (FIG. 10). On the other hand when the dog clutch 17 is in engagement with the bevel pinion 44 which is mounted freely rotatably on the drive shaft 35, it drives this shaft in the opposite direction to the direction of rotation of the other shaft 36 so that the direction of rotation of the corresponding rotary rake head 1 is reversed. The two rotary rake heads 1 and 2 then rotate in the same direction indicated by the arrows F and F', which corresponds to the lateral windrowing position (FIG. 11).

One important characteristic of the invention consists in that between the links 15, 24 and 33 and the dog clutch 17 there is disposed a pressure limiter device 54 or 55. This device absorbs displacements controlled by the said links 15, 24 and 33 in transpositions of the machine from the central tedding position into the lateral windrowing position or vice versa, when the teeth 48 or 49 of the dog clutch 17 are opposite to teeth 50 or 51 of the bevel pinions 43 or 44. Moreover this pressure limiter device 54 or 55 automatically causes meshing of the dog clutch 17 with the bevel pinions 43 or 44 as soon as the teeth 48 or 49 of the said dog clutch, as a result of an angular rotation, can mesh with the teeth 50 or 51 of the said bevel pinions 43 or 44.

Figure 12:
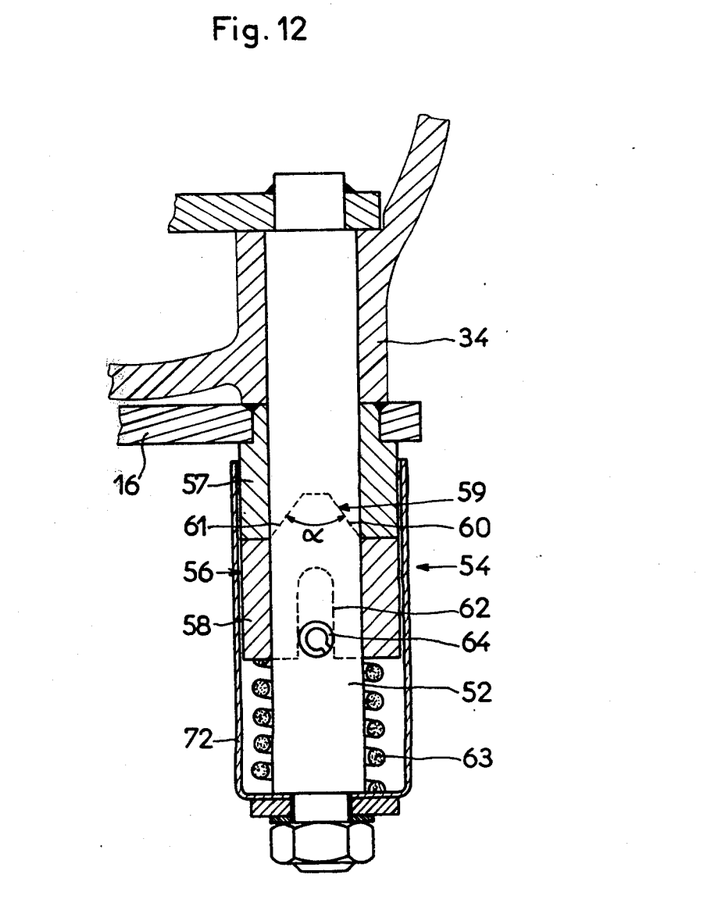
FIG. 12 shows a longitudinal section of a first embodiment of a pressure limiter according to the invention.

In the embodiment of the pressure limiter 54 which is represented in section in FIG. 12, the pressure limiter is composed especially of a tube 56 formed by two parts 57 and 58. These parts can mesh with one another by means of a device 59 of mortice and tenon type the contact faces 60 and 61 of which form an angle a between them of about 75°. The part 57 of the tube 56 is rigidly connected to the control lever 16 while the part 58 is fixed against rotation relative to the aforementioned operating shaft 52 which controls the dog clutch 17, but can move axially on the said shaft 52 against the force of a compression spring 63. To this end the movable part 58 comprises a longitudinal groove 62 in which a pin 64 is situated which is fixed on the operating shaft 52; the said pin 64 ensures the rotation of the said movable part 58 with the said shaft 52. Thus when during a change of working position of the machine the teeth 48 or 49 of the dog clutch 17 and the teeth 50 or 51 of the bevel pinions 43 or 44 are situated face to face, the movable part 58 of the tube 56 can disengage itself at least partially from the part 57 which is fixed to the control lever 16 in order to uncouple the said control lever 16 from the operating shaft 52 and limit the pressure exerted upon the dog clutch 17. Moreover as soon as the teeth 50 or 51 of the bevel pinion 43 or 44, as a result of an angular rotation of the said pinion, can mesh with the teeth 48 or 49 of the dog clutch 17, the compression spring 63 pushes the movable part 58 of the tube 56 towards the part 57 so as to cause their engagement. Since the contact faces 60 and 61 of the engagement device 59 between the parts 57 and 58 of the tube 56 form an angle a between them, the movable part 58 is then subjected to a pivoting about its longitudinal axis and thus actuates the operating shaft 52 which causes the meshing of the dog clutch 17 with the appropriate bevel pinion 43 or 44. This device can be surrounded by a guard 72.

Figure 13:
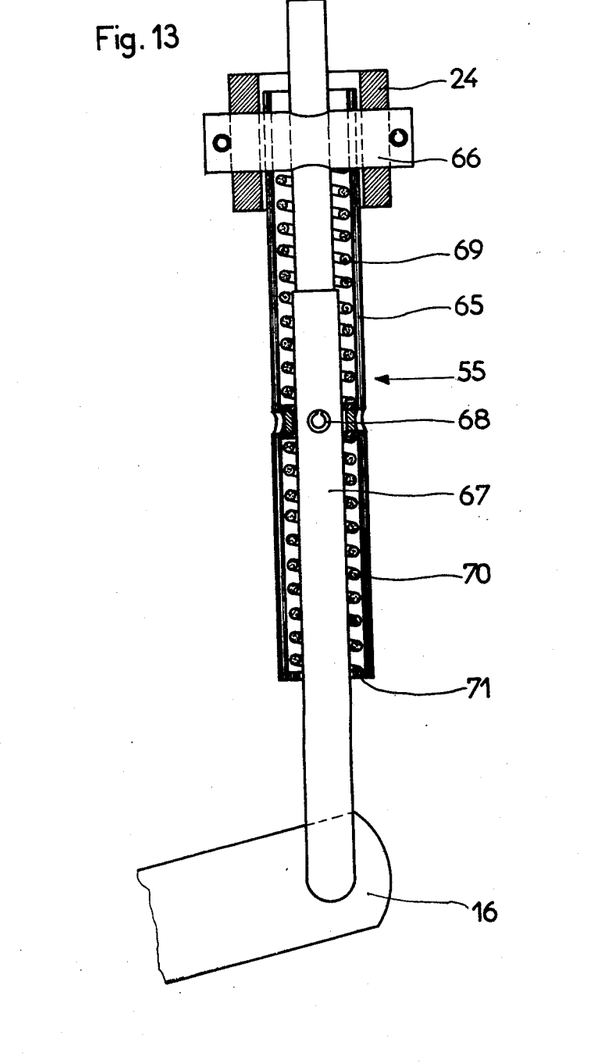
FIG. 13 shows a longitudinal section of a second embodiment of a pressure limiter according to the invention.

In the embodiment of the pressure limiter 55 which is represented in FIG. 13, the limiter is composed of a sheath 65 which is pivotally mounted on the link 24 by means of a swivel pin 66. Through this sheath 65 there extends a spindle 67 fixed to the control lever 16 and comprising a stop 68. On either side of this stop 68 there are disposed compression springs 69 and 70 which surround the spindle 67 over its part situated in the said sheath 65 and one of which abuts against the swivel pin 66 and the other of which abuts against a stop 71 provided at the other extremity of the sheath 65.

Thus when during a change of working position of the machine the teeth 48 or 49 of the dog clutch 17 face teeth 50 or 51 of the bevel pinions 43 or 44, the sheath 65 can move longitudinally against the force of one or the other of the compression springs 69 or 70 under the action of the link 24, without maneuvering the control lever 16. Thus the pressure exerted upon the dog clutch 17 is limited. Moreover as soon as the teeth 48 or 49 of the clutch 17 can engage with the teeth 50 or 51 of the appropriate bevel pinion 43 or 44, the compression spring 69 or 70 which was compressed in the displacement of the sheath 65 pushes the spindle 67, which is fixed to the control lever 16, so that the latter causes the engagement of the dog clutch 17 with the said appropriate bevel pinion 43 or 44.

What is claimed is:

1. In a combined haymaking machine for central tedding and lateral windrowing, having at least two rotary rake heads carrying working tools, which are driven in rotation and are interconnected by means of a support chassis upon which at least one frame is pivotally mounted which extends forward in the direction of travel of the machine and permits the coupling of the machine to a propelling vehicle; the improvement comprising means carried by the chassis automatically to cause the reversal of the direction of rotation of at least one of the rotary rake heads when the relative position between the support chassis of the rotary rake heads and said frame beam permitting coupling of the machine to a propelling vehicle is modified, thereby to transpose the machine from the central tedding position into the lateral windrowing position and vice versa.

2. A machine according to claim 1, wherein said frame beam comprises at its extremity adjacent the support chassis a link, and a dog clutch having a lever actuated by said link for the reversal of the direction of rotation of at least one of the rotary rake heads, when said support chassis is pivoted in relation to said frame beam in a substantially horizontal plane.

3. A machine according to claim 1 and an intermediate element by which said frame beam is articulated on the support chassis of the rotary rake heads, said intermediate element comprising a link, and having a control lever actuated by said link for the reversal of the direction of rotation of at least one of the rotary rake heads when the support chassis is pivoted in relation to the said frame beam for the modification of the inclination of the axes of rotation of the rotary rake heads in relation to the ground.

4. A machine according to claim 1, wherein said rotary rake heads have land wheels having support spindles that are connected to the frame beam permitting the coupling of the machine to the propelling vehicle, a link interconnecting said spindles, and a dog clutch having a control lever connected to said link for the reversal of the direction of rotation of at least one of said rotary rake heads, so that when the support chassis is pivoted in relation to the frame beam in a substantially horizontal plane, the position of said land wheels and the direction of rotation of at least one of the rotary rake heads are modified simultaneously and automatically.

5. In a combined haymaking machine for central tedding and lateral windrowing, having at least two rotary rake heads carrying working tools which are driven in rotation and are interconnected by means of a support chassis on which at least one frame beam is pivotally mounted which extends forward in the direction of travel of the machine and permits coupling of the machine to a propelling vehicle; the improvement comprising a dog clutch having a control lever, a link which is pivotally connected to said beam and which actuates said control lever, first and second pinions for rotating the rotary rake heads in opposite directions depending on which pinion is driven, said dog clutch having teeth that mesh with complementary teeth of said first or a second bevel pinion in order to cause the reversal of the direction of rotation of at least one of the rotary rake heads when the relative position is modified between said beam and said support chassis to transpose the machine from the central tedding position into the lateral windrowing position or vice versa, and a pressure limiter between said link and said dog clutch to absorb the displacements controlled by said link on the occasion of said transpositions when the teeth of the dog clutch are facing complementary teeth of said bevel pinions and cannot mesh with these, and to cause the meshing of the dog clutch with said bevel pinions automatically as soon as, as a result of a rotation, the teeth of said dog clutch can mesh with the teeth of the said bevel pinions.

6. A machine according to claim 5, wherein the pressure limiter comprises a tube in two parts which can mesh with one another by means of a device of mortice and tenon type, the contact faces of which form an angle between them, one of the said parts being rigidly connected to the control lever which is actuated by the link while the other part is fixed to rotation with an operating shaft which controls the dog clutch, and can be displaced axially on the said shaft against the force of a compression spring.

7. A machine according to claim 5, wherein the pressure limiter comprises a sheath which is articulated on the link and through which there extends a spindle fixed to the control lever of the dog clutch, the said spindle comprising a stop on either side of which there are disposed compression springs which surround the said spindle over its part situated in the sheath and which abut against stops provided at the two extremities of the said sheath.

* * * * *